Jan. 31, 1967 R. A. PLYER 3,301,967

AUTOMATIC CALL TRANSMITTER FOR REPERTORY DIALING USING MULTIFREQUENCY PULSES

Filed Sept. 11, 1963 5 Sheets-Sheet 1

INVENTOR
R. A. PLYER
BY
S E Hollander
ATTORNEY

Jan. 31, 1967 R. A. PLYER 3,301,967

AUTOMATIC CALL TRANSMITTER FOR REPERTORY DIALING USING MULTIFREQUENCY PULSES

Filed Sept. 11, 1963 5 Sheets-Sheet 3

Jan. 31, 1967 R. A. PLYER 3,301,967

AUTOMATIC CALL TRANSMITTER FOR REPERTORY DIALING USING MULTIFREQUENCY PULSES

Filed Sept. 11, 1963 5 Sheets-Sheet 4

United States Patent Office 3,301,967
Patented Jan. 31, 1967

3,301,967

AUTOMATIC CALL TRANSMITTER FOR REPERTORY DIALING USING MULTIFREQUENCY PULSES

Roger A. Plyer, Vienna, Va., assignor to American Telephone and Telegraph Company, New York, N.Y., a corporation of New York Filed Sept. 11, 1963, Ser. No. 308,128
11 Claims. (Cl. 179—90)

This invention relates to automatic telephone systems and particularly to improved means for facilitating the placing of calls from subscribers' stations in such systems. More particularly, this invention relates to an automatic call transmitter for automatically dialing multifrequency address pulses corresponding to a particular called station selected from amongst a group of automatically dialed stations in response to the actuation of a single key corresponding to the called station.

With present telephone systems, a traditional manual subscriber dialing arrangement remains by far the most common means of signaling from subscribers' stations. The desire to constantly improve the telephone system has led to new signaling techniques, one of which has been a means of signaling with multifrequency pulses of energy. Dial telephones employing this scheme have been developed to provide a faster, more convenient service. Reference may be made to L. A. Meacham et al. application, Serial No. 759,474, filed September 8, 1958, now Patent No. 3,184,554, for a disclosure of such a multifrequency dial telephone set.

Along with the improvement and modernization of the telephone plant came a desire for yet faster, more reliable and more accurate dialing means with a minimum of memory requirement on the part of the subscriber. This was coupled with a need to speed the rate of information transmission to central office equipment so as to reduce the time that expensive common equipment is used by any one station, thereby increasing the availability of this central equipment to all other subscribers and also to reduce the time a subscriber must be active in placing a call. It is, of course, desirable to attain these objectives simply and economically while at the same time retaining the flexibility and selectivity of the telephone network so that specific improvements be compatible with existing equipment.

Instances where the need for an improved service is apparent appear where a group of numbers are frequently and repeatedly called, or the message time of a call is comparable or less than the manual dial time. More recently there has been an indicated need for a sure and quick dialable communications link between two stations, or modified "hot-line" service for military and certain governmental service personnel. In this connection it is extremely important to provide a communications link from a particular and important station to any one of a number of frequently called stations, or any station that must be reached in a minimum of time during times of emergency, national disaster, or for civil defense purposes. A means was needed to provide this "hot-line" service so that accurate, fast, and reliable telephone connections could be set up from any particular station so equipped to any one of a group of chosen stations located anywhere in the country.

The prior art contains automatic and repertory dialers which are capable of transmitting automatically, or semi-automatically, in various ways, the signals required to set up a call through the telephone switching network. Characteristically, these dialers may be grouped into one of two classes: in one, there is repertory or permanent memory provided either at the station or at the central office; in the other, there is a manual presetting of the desired called station before the call can be originated. Exemplary of the former class are those arrangements which respond to the manual dialing of a number of code digits (less than the number of digits contained in the telephone address code) to cause central office magnetic memory means to complete the talking path to the called party. The central office detects the dialed digits and translates them into the full seven- or ten-digit address code familiar to the existing switching equipment. Modifications of this scheme are possible to allow memory facilities of various kinds existing either at the central office or at the calling station to allow a connection to be set up from one particular subscriber to another particular subscriber by numerous and diverse means. While representing an advance in the speed of signaling made available, such arrangements exhibit certain deficiencies. Either the only saving in time is in the reduced effort in dialing two digits instead of seven, or there is no increase in accuracy, or very little increased flexibility, or great increase of amount of expensive central office equipment needed, or there is a lack of compatibility with existing equipment so that the desirability of these arrangements is considerably reduced.

Exemplary of the class wherein a manual presetting of the desired called station is necessary before the call can be originated are the arrangements whereby a called station number is semipermanently preset by the calling subscriber, and the actuation of a separate outpulsing key causes the address code to be transmitted. Other variations of repertory dialers of this type include schemes whereby a number is transmitted by the actuation of a key after selecting the desired subscriber's number by rotating a dial to make the number appear within the indicator space provided. While somewhat reducing the inaccuracy possible, these schemes either do not reduce the human memory required or they are very inflexible so that they may not be easily used to perform functions of a standard dial transmitter in dialing numbers not in the repertory. In addition, these types of automatic dialers are limited advances because there is little, if any, reduction in dialing time and also because they are usually expensive.

From the foregoing discussion it will be apparent that an attractive arrangement for expeditiously supplying automatic calling facilities to subscribers of an exchange will be one having the advantages of direct station selection of important or frequently called stations incorporating the desirable qualities of ease, lack of need for fallible human memory, simplicity with attendant low cost and quick but accurate transmission, together with compatibility with the general telephone network.

It is, therefore, an object of this invention to provide an improved automatic dialing means enabling the station provided to select from and call any one of a chosen group of subscribers in the country by actuating a key.

It is another object of this invention to provide improved station signaling apparatus compatible with existing telephone equipment and yet simple in design.

It is another object of this invention to provide an automatic multifrequency dialer which is fast, reliable and accurate in transmitting the dialed information and yet requires a minimum amount of station equipment.

The foregoing objects are satisfied in one specific embodiment of the invention wherein a standard multifrequency transmitting subscriber station such as a Touch-Tone station is provided with a group of keys each of which corresponds to a particular station at any point in the country, so long as there is direct distance dialing service provided between the two and so long as the central office associated with the calling station is equipped to accept multifrequency dial pulses. A subscriber at a calling station need only lift the handset, wait for dial tone, and actuate the key corresponding to the desired station. No code digits need be dialed when automatically dialing and the subset may still be used in its normal fashion to call other than preselected numbers from the group of automatically dialed stations.

The actuation of the key enables a timing circuit whose generated output pulses cause the initiation of a stepping sequence for a group of common stepping relays which first count sequentially in a forward direction and then in a reverse direction, traversing the same sequence of steps to return to its initial state. The contacts of six stepping relays together with an auxiliary relay convert serial pulses from the timing circuit into a sequential array of twelve parallelly appearing pulses. Each of these twelve marks is converted into a pair of marks and each such pair causes the transmission of a multifrequency digit pulse by pulse exciting the pair of inputs of a shock excited oscillator that corresponds to the frequencies comprising the multifrequency digit pulse.

Thus, the instant automatic dialing arrangement contains in combination a relay counting chain arrangement to count $2h$ digits using $n+1$ relays which sequentially step in a first direction and sequentially release in the reverse direction in response to pulses applied alternately on each of two inputs.

A feature of the invention includes means with which a subscriber at one station may directly dial one of a group of stations located anywhere in the country simply by operating the key corresponding to the selected station.

Still another feature of the invention includes facilities to transmit to a telephone line up to twelve digits in a completely automatic fashion by means of six stepping relays and one auxiliary relay which step first in one direction and then in a second direction.

Yet another feature of the invention includes means to automatically and accurately dial at a very rapid rate the multifrequency telephone address code.

A further feature of this invention is an arrangement which provides simplicity of needed station equipment without any requirement of changes or modifications at the central office.

An appreciation of these and other features of the invention can be had upon consideration of the following description and the drawing which shows a specific illustrative embodiment of the invention using a detached contact representation for the relays shown:

In order to better understand the invention, some background with respect to multifrequency signaling is helpful. In this connection, it must be understood that multifrequency signaling techniques used in the telephone plant generally utilize various frequencies within the voice frequency spectrum and must therefore be judiciously selected so that the probability of these elements appearing in the normal voice during speech and causing false signaling is very small. To further lessen the possibility of false signaling by voice frequencies, two frequencies are chosen in combination to be used as a digit for signaling. Thus, a combination of two different frequencies are representative of each digit and are transmitted from a subscriber substation to a central office capable of receiving the same.

Various advantages are derived from this new signaling means, one of which is speed of dialing. An arrangement employing this technique, known at Touch-Tone dialing, is disclosed by L. A. Meacham et al., as mentioned previously.

In this connection, it is possible to modify such a Touch-Tone arrangement to perform in combination with my invention, or to modify any arrangement used in conjunction with central offices which accept multifrequency dial pulses by including an oscillator such as that used in the above-mentioned application.

Figure 1:
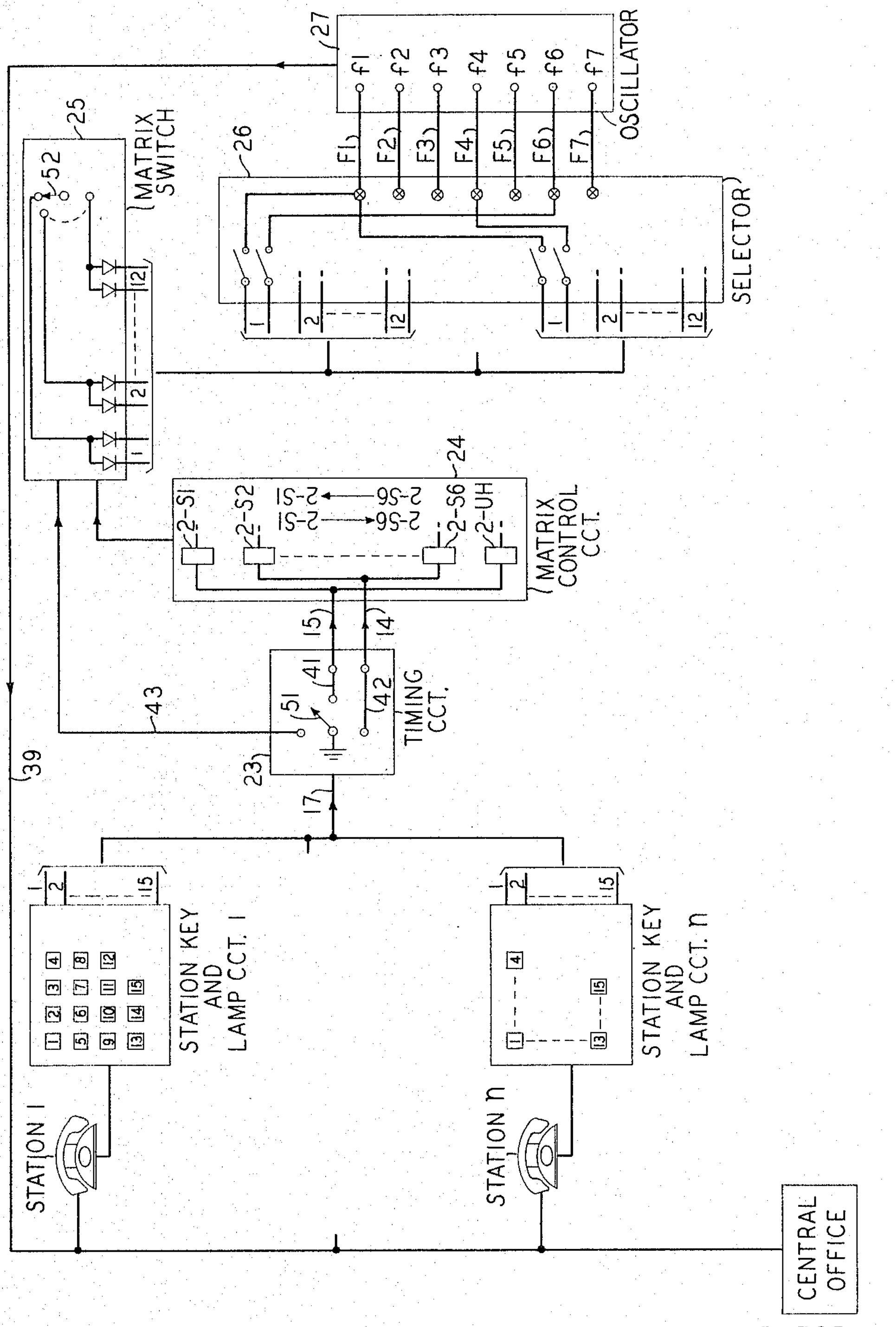
FIG. 1 is a block diagram showing a specific illustrative embodiment of the invention used in conjunction with standard dial telephone sets in outline form.
Figure 1A:
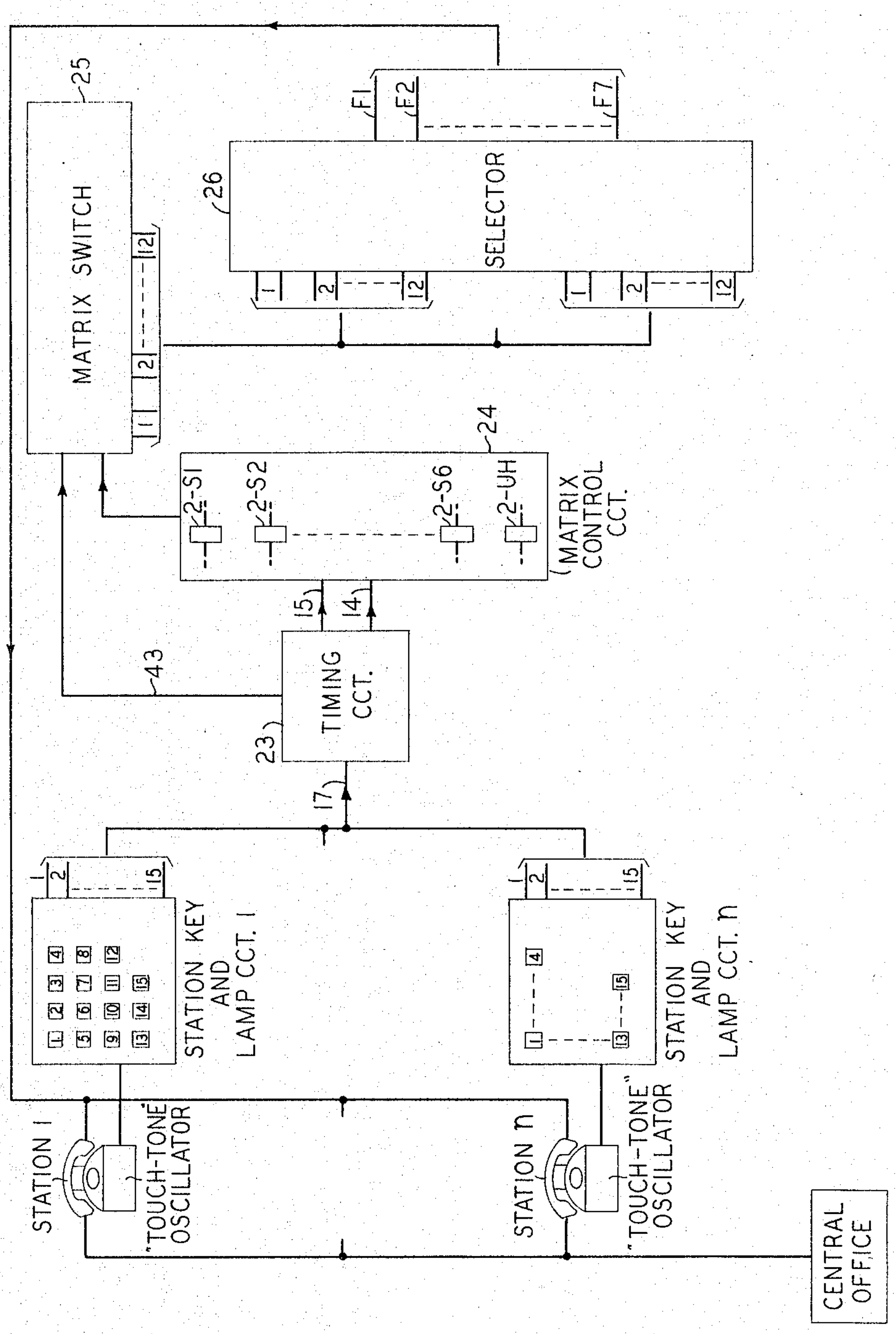
FIG. 1A is a block diagram showing a specific illustrative embodiment of the invention used in conjunction with modified Touch-Tone telephone sets in outline form.

With reference to FIGS. 1 and 1A of the drawing, it is to be understood that the embodiments disclosed therein are purely illustrative and not to be deemed limiting. For the purpose of illustration, fifteen keys are shown each corresponding to a particular subscriber existing anywhere within the country and accessible by direct distance dialing. It is, of course, obvious that this number can be extended to any desired number of automatically called parties by a single modification which includes the obvious addition of equipment in the key circuit (e.g., one key, and one relay per called station added). Similarly, with reference to FIG. 3, terminal punchings T–1 to T–12 are provided for the transmission of twelve digits. It is to be understood that by a simple modification obvious to those versed in the art, the number of relays of the matrix control circuit 24 shown in FIG. 2 may be increased to provide for a greater number of digits, if desired. It is to be noted that if there are $n+1$ relays in the chain shown in FIG. 2, then it is possible to modify FIG. 3 so that $2n$ digits are capable of being transmitted. For the purpose of our illustration, the capability of transmitting twelve digits will be sufficient to illustrate the application, although generally speaking most telephone numbers contain no more than ten digits.

FIGS. 1 and 1A show two specific embodiments of the invention in block diagram form. FIG. 1A shows the arrangement for originating subscriber stations of the Touch-Tone type, with self-contained oscillators. The output from the selector is directly connected to the originating subscriber's own oscillator circuitry. However, unlike the Touch-Tone sets, many existing standard dial telephone sets are not so equipped and are, therefore, not capable of outpulsing multifrequency digits. The embodiments shown in FIG. 1 is, therefore, used to accommodate these telephone sets. In this arrangement the output from the selector is connected to a separately provided oscillator of the type contained in the aforementioned Touch-Tone set. The output of this oscillator is used to pulse the tones to the central office via the talking conductors.

FIG. 1, which is substantially identical to FIG. 1A except for the distinctions mentioned above, is the embodiment that will be described herein, but it is to be noted that the principle for both is substantially the same.

I. GENERAL DESCRIPTION

Referring to FIG. 1, it is seen that one key field may be provided for each extension telephone on the same line. There is shown illustratively fifteen keys corresponding to fifteen automatically dialed stations. To automatically dial a call, the subscriber at any one station comes off-hook to establish the connection from the telephone set to the key field, and actuates the key corresponding to the desired distant station. The actuation of the key causes a busy lamp (shown in FIG. 2) to light at all other stations and initiates the operation of the timing circuit 23. Switch 51 is shown to symbolically represent the operation of the timing circuit, and steps in a manner so as to apply ground at the terminals of the three conductors shown in the following sequential manner: 41, 43, 42, 43, 41 . . . . The grounds sequentially appearing on conductors 41 and 42 cause the relays 2–S– in the stepping chain of the matrix control circuit 24 to step first in a forward direction until the end of the chain and then release by stepping in a reverse direction. The relays are energized in the forward direction ($2\text{–}S_1$, $2\text{–}S_2$ . . . $2\text{–}S_6$) by having the previous relay in the chain prepare an energizing path for the next, and are released in the reverse direction ($2\text{–}S_6$, $2\text{–}S_5$ . . . $2\text{–}S_1$) by having the previously released relay provided a shunt path across relay winding in the chain. Each step of the relays in the matrix control circuit causes switch 52 (which is symbolic of the relay contacts of the relays in the matrix control circuit) in the matrix switch 25 to advance one position along the path from the terminal of conductor 1 toward the terminal of conductor 12, and because of the operation of switch 51, a ground pulse applied to conductor 43 appears sequentially on conductor pairs 1 through 12. The twelve pairs of conductors containing the sequentially applied grounds are thereafter connected in parallel to the input of the selector 26. Every group of twelve so appearing is cross connected in a coded arrangement to the seven output conductors through groups of switches. Each group of switches corresponds to and is controlled by a specific key and, therefore, only the switches which correspond to the desired called party are closed by the actuation of the key selected. The particular cross connections between the twelve input conductors appearing at closed switches in the selector and conductors F1 through F7 establish the coded arrangement necessary to outpulse the multifrequency address pulse. Conductors F1 through F7 are connected to inputs *f*1 through *f*7, respectively, of oscillator 27, and correspond to the frequencies *f*1 through *f*7 generated by the shock excited oscillator in response to a pulse appearing at the respective inputs (e.g., a ground on conductor F3 causes the generation and transmission of frequency *f*3). Therefore, the first pair of grounds from conductor 1 is connected by the selector switches to the pair of conductors from amongst F1 through F7 which correspond to the frequencies of the first multifrequency digit in the address of the called party corresponding to the key actuated.

Thus, in a typical call, the receiver is removed and the key is actuated to cause the initiation of the timing circuit grouped pulses. These pulses in turn cause the relays of the matrix control circuit to step so that the matrix switch alternately applies a ground to twelve pairs of conductors which are cross connected through switches controlled by and corresponding to the key actuated. The coded grounds appearing sequentially in time at the input to the oscillator then cause the generation of the multifrequency address pulses for transmission via conductor 39 to the central office.

The arrangement shown in FIG. 1A operates in a manner identical with that described above with the exception that the selector output, instead of being connected to an external oscillator of a suitable type, is connected directly to the calling station subset which, because it is of the Touch-Tone type, has a self contained oscillator.

II. DETAILED DESCRIPTION

Figure 2:
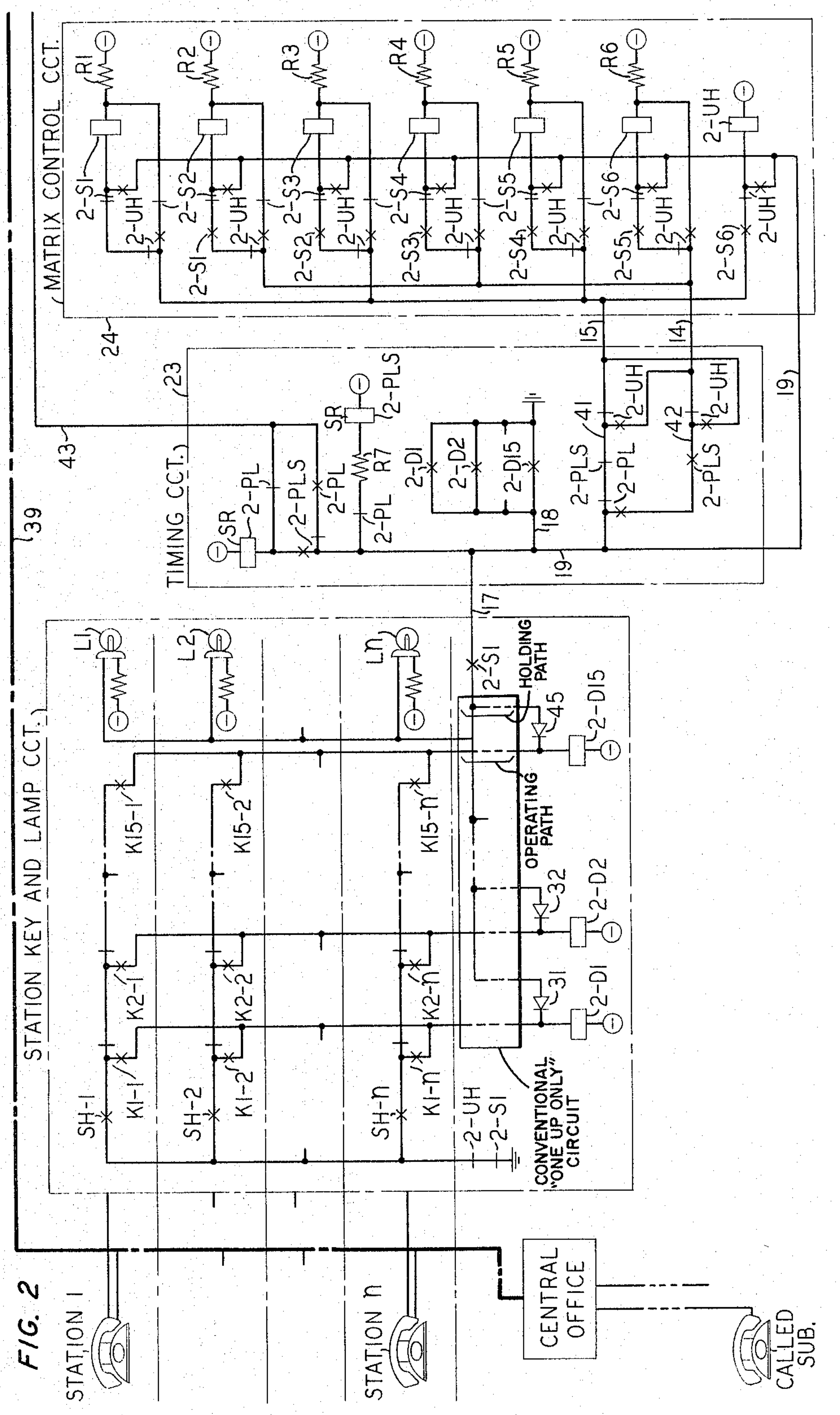
FIG. 2 is a schematic diagram showing the details of the station key and lamp circuits and the timing circuit used to drive the stepping relays of the matrix control circuit.
Figure 3:
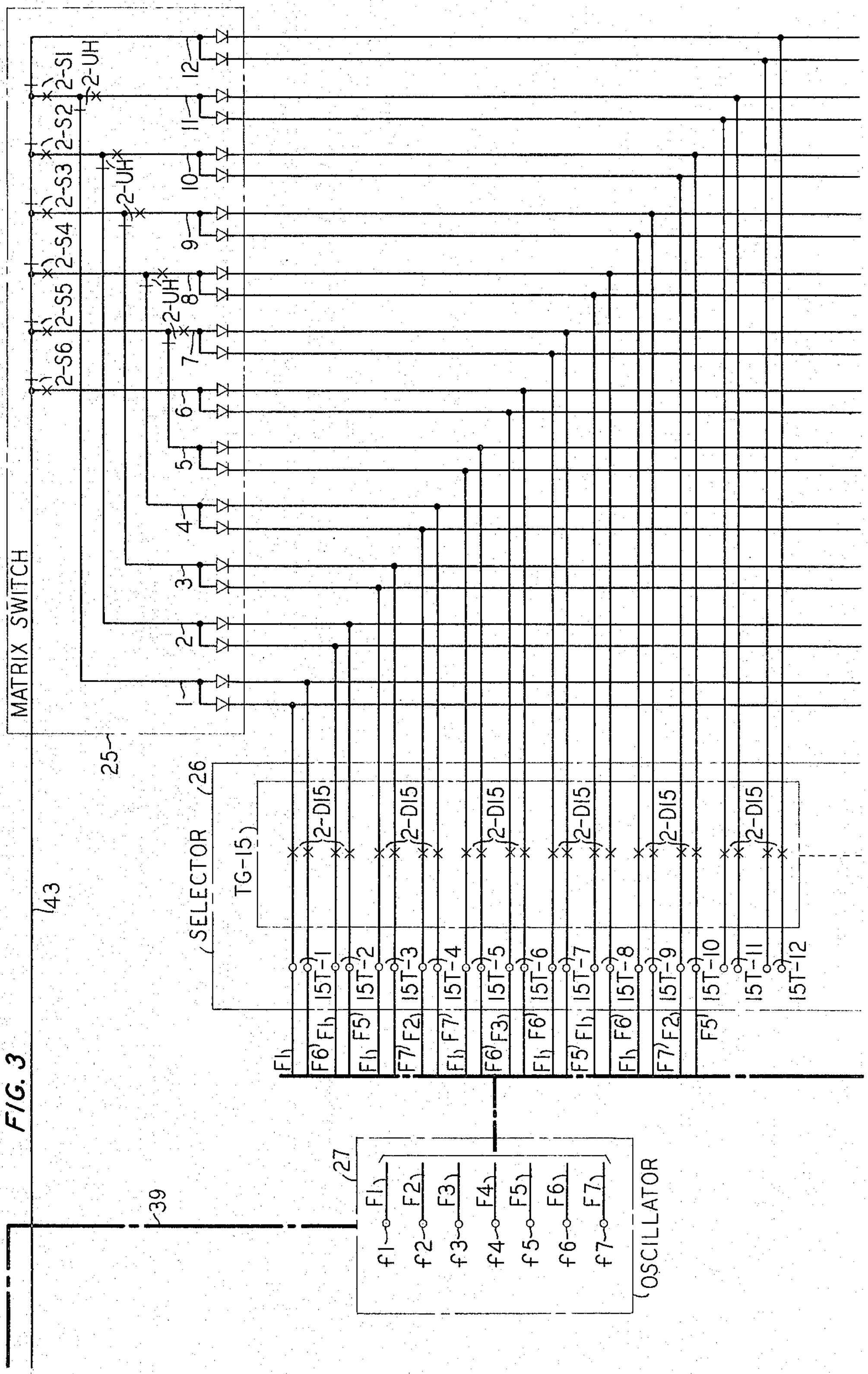
FIGS. 3 and 4 show the details of the matrix control circuit.
Figure 4:
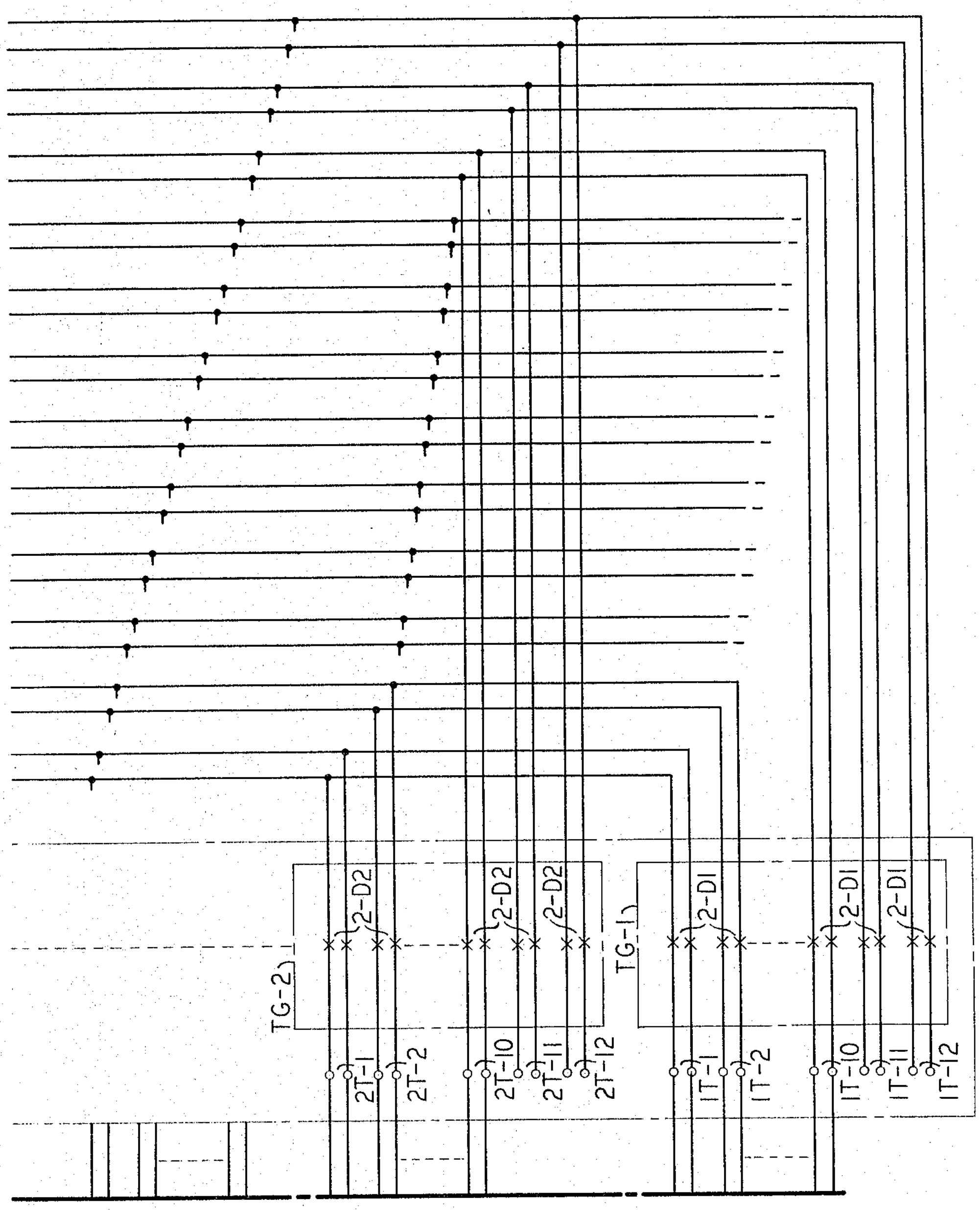
Figure 5:
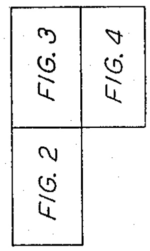
FIG. 5 shows the interrelationship of FIGS. 2 through 4.

The automatic dialing of a call can be described in greater detail by referring to FIGS. 2 through 4.

A. *Major components*

(1) *Station key and lamp circuit.*—The selection of the desired called station is made by pushing the nonlocking key corresponding to that station. Each key is arranged so that only one can be mechanically operated at a time. With reference to FIG. 2 it will be assumed that key K15 of subscriber 1, or K15–1, is the selected key. Associated with each key K1– through K15 is a relay 2–D1 through 2–D15, respectively, of which only relays 2–D1, 2–D2, and 2–D15 are shown (e.g., relay 2–D1 is associated with keys K1–1 through K1–*n*). When key K15–1 is engaged, relay 2–D15 is activated over a path from battery, winding of relay 2–D15, normally open contacts K15–1 which is temporarily held closed by the subscriber, the normally closed contacts of keys K14–1 through K3–1 (not shown), K2–1, K1–1, switchhook contacts of the dialing station SH–1 which have been closed by lifting the handset, normally closed contacts 2–UH and 2–S1 to ground. As shown in FIG. 2 the operating paths and holding paths of relays 2–D1 through 2–D15 pass through a block labeled conventional "one-up-only" circuit. This block represents in general terms a circuit for preventing the operation of more than one relay 2–D– at a time. One arrangement for accomplishing this result is the placement of make contacts of each relay in its respective holding circuit. Still another arrangement is the placement of break contacts of every other relay 2–D– in the operating circuit of each relay. Other well known circuits may be contrived as variations of the above by one skilled in the art. Relay 2–D15 priorly operated is held over a path which includes the "one-up-only" circuit, diode 45, a make contact of operated relay 2–S1 which is to be discussed, conductors 17 and 18, and a make contact of relay 2–D15. Busy lamps L1 through L*n* are lighted over part of the same path which includes the contacts of relays 2–S1 and 2D15. An attempt to initiate a second automatically dialed call at a second station will be blocked while the busy lamp is lit, for after relay 2–S1 has been energized the ground to all other relays 2–D– has been removed by break contacts 2–S1.

(2) *Timing circuit and matrix control circuit.*—Relay 2–S1 is energized over a path which includes ground, normally open contacts of relay 2–D15, conductor 18, conductor 19, transfer contacts of relay 2–PL, normally closed contacts of relay 2–PLS, conductor 41, transfer contacts of relay 2–UH, conductor 15, transfer contacts of relays 2–UH and 2–S1, winding of relay 2–S1 and resistor R1 to battery. When relay 2–S1 operates, it locks up on its own holding path from battery, through resistor R1, winding of relay 2–S1, operated transfer contacts of relay 2–S1, conductors 19 and 18, contacts of relay 2–D15 to ground.

The energization of relay 2–D15 causes the timing circuit 23 to be activated and begin pulsing. Relay 2–PLS is energized over a path from ground through contacts of relays 2–D15 and 2–PL, resistor R7, winding of relay 2–PLS to battery. As a result of the energization of relay 2-PLS, a ground pulse appears on conductor 43 (after the ground is removed from conductor 41), through the contacts of relay 2–D15 transfer contacts of relays 2–PLS and contacts of relay 2–PL. The function performed by the ground condition on conductor 43 will be described subsequently.

As a result of the energization of relay 2–PLS, relay 2–PL is energized over a path from ground through make contacts of relay 2–D15, transfer contacts of relay 2–PLS, winding of relay 2–PL to battery. Relay 2–PL, upon being energized, removes the ground from conductor 43 and applies ground to conductor 42 to operate relay 2–S2 over a path which includes ground, make contacts of relay 2–D15, conductor 18, conductor 19, transfer contact of relay 2–PL, contacts of relay 2–PLS (which remain closed at this time in view of the slow release characteristic of that relay), conductor 42, transfer contacts of relay 2–UH, conductor 14, transfer contacts of relay 2–UH, contacts of relay 2–S1, transfer contacts of relay 2–S2, winding of relay 2–S2, resistor R2 to battery. When relay 2–S2 operates, it locks up on its own holding path from battery, through resistor R2, winding of relay 2–S2, operated transfer contacts of relay 2–S2, conductors 19 and 18, contacts of relay 2–D15 to ground.

The timing circuit continues its timing cycle since the operation of relay 2–PL causes the release of relay 2–PLS by the interruption of ground to relay 2–PLS after the opening of break contacts of relay 2–PL. As a result of the release of relay 2–PLS, ground is removed from conductor 42 and is applied to conductor 43 by means of a path from ground, through make contacts of relay 2D–15, conductor 18, transfer contacts of relay 2–PLS, contacts of relay 2–PL (which remain closed at this time in view of the slow release characteristic of relay 2–PL), to conductor 43. The first cycle for the timing circuit is completed after the release of relay 2–PLS and the restoration of its transfer contacts to normal which causes the release of relay 2–PL by removing ground from its winding. (Each timing circuit cycle therefore causes the stepping of two matrix control circuit relays.) This results in the removal of ground from conductor 43. The next two identical cycles of the timing circuit 23 cause the operation of relays 2–S3 through 2–S6 in a similar manner, together with ground pulses appearing on conductor 43 at the appropriate time in the cycle. At the conclusion of the third timing circuit cycle, relay 2–UH is energized by means of a ground pulse appearing on conductor 41 as described previously when both relays 2–PL and 2–PLS are released. The energization path for relay 2–UH includes the ground on conductor 41, transfer contacts of relay 2–UH, conductor 15, contacts of relay 2–S6, transfer contacts of relay 2–UH, winding of relay 2–UH and battery. Relay 2–UH locks up on its own holding path to conductor 19 in a familiar fashion. Subsequent to the energization of relay 2–UH, relay 2–S6 is released by a shunt appearing across its winding in the following manner: from the ground persisting on conductor 41, through operated transfer contact 2–UH, to conductor 14, through operated transfer contact of relay 2–UH to the winding of relay 2–S6 its transfer contacts, to conductor 19 which returns to ground. Conductors 41 and 14 and conductors 42 and 15 are now electrically joined through the transfer contacts of energized relay 2–UH.

As the timing circuit 23 continues its cyclic operation after the release of relay 2–S6, relay 2–PLS is energized, ground is removed from conductor 41 as before, and ground is applied to conductor 43. As a consequence of the operation of relay 2–PLS, relay 2–PL operates as before to remove the ground from conductor 43. Also, as a result relay 2–S5 is released by a shunt appearing across its winding (as had previously occurred to relay 2–S6) because of the ground connected from conductor 42, transfer contacts of relay 2–UH, conductor 15, transfer contacts of relay 2–UH, contacts of relay 2–S6, winding of relay 2–S5, transfer contacts of winding S5, to conductor 19 which has ground applied through contact 2–D15. The fourth timing circuit cycle is completed by the release of relays 2–PLS and 2–PL, respectively, with the ensuing ground on conductor 43 as a result of the release of relay PLS.

The fifth and the sixth timing circuit cycles continue in a like manner to cause the release of relays 2–S4 through 2–S1. The release of relay 2–S1 completes the dialing operation and causes the release of timing circuit 23 and the extinguishment of the busy lamps by releasing relay 2–D15. In addition, relay 2–UH is de-energized by the opening of the contacts of relay 2–D15 in the holding circuit of which conductor 19 is a part and the circuit is restored to normal to await the next call.

Thus, the sequence of operation of relays in the matrix control circuit 24 has been: sequential operation of relays 2–S1 through 2–S6, operation of relay 2–UH and the sequential release of relays 2–S6 through 2–S1, and finally the release of relay 2–UH. The release has been accomplished by utilizing break contacts of a higher numbered relay to complete the shunt across the winding of the relay one number down in the chain. These operations have been synchronized by the timing circuit through the appearance of grounds on conductors 41 and 42 which have been steered to the appropriate relay in the chain. In addition, the ground appearing on conductor 43 has alternated with each of the grounds appearing on either conductor 41 or 42. That is, the sequence of ground on conductors 41, 42, and 43 has been 41, 43, 42, 43, 41, 43 . . . .

(3) *Matrix switch.*—The function of the ground on conductor 43 can be seen by making reference to FIG. 3 which shows the matrix switch 25 and selector circuit 26. In the matrix switch, the ground from conductor 43 appears first on conductor 1 and then on conductors 2 through 12, successively. This is accomplished by means of the matrix control circuit 24, or the operation and release of relays 2–S1 through 2–S6 as described above. It can be seen that, at the start of the operation of the matrix control switch chain, when the first ground appears on conductor 43, it appears simultaneously on conductor 1, through unoperated transfer contacts of relays 2–S6 to 2–S2, operated transfer contacts of relay 2–S1, and unoperated transfer contacts of relay 2–UH to conductor 1. After the operation of relay 2–S2 and the reapplication of ground to conductor 43, ground from conductor 1 is removed and applied to conductor 2 via a portion of the former path or through transfer contacts of relays 2–S6 to 2–S2 and transfer contacts of relay 2–UH. In a similar fashion, the ground from conductor 43 shifts successively to conductors 3 through 6. At this point, relay 2–S6 has been energized to cause the energization of relay 2–UH which has, in turn, caused the release of relay 2–S6 by way of the persisting ground on conductor 41, as described previously.

With the advent of the next ground on conductor 43, conductor 7 receives the ground through the contacts of released relay 2–S6, transfer contacts of relays 2–S5 and 2–UH. Again, in a similar fashion, conductors 8 through 12, successively, receive the ground from conductor 43.

(4) *Selector and oscillator.*—Each pair of diodes connected to conductors 1 through 12 converts the single mark, or ground, to a pair of marks which are connected therefrom in parallel, to make contacts of relays 2D– in terminal groups TG–1 through TQ–15 of the selector 26. Consistent with the assumption that key K15–1 has been actuated only relay 2D–15 is operated, only terminal group TG–15 is activated and only the pairs of marks from conductors 1 through 12 to terminal TG–15 are therefore available for the actual automatic multifrequency dialing.

It is to be noted that each pair of conductors at each terminal —T— in each terminal grouping TG–1 through TG–15 connects to a pair of inputs on a shock excited oscillator of the type which is capable of generating two simultaneous frequencies when excited at the two of its inputs corresponding to the two frequencies desired. Such an oscillator capable of transmitting up to seven different frequencies in response to grounds appearing at any of the selected seven inputs is disclosed in the reference L. A. Meacham application referred to earlier.

At each of the terminal groupings TG–1 to TG–15 the terminals —T— are cross connected in such a manner as to put the proper oscillator inputs corresponding to the proper frequency combination of the digits of the called number in front of each terminal or digit position in the order in which it is to be transmitted. Thus, had key K2– been pressed, TG–2 would have been actuated and the sequential pulses from conductors 1 through 12 would have appeared on terminals 2T–1 to 2T–12 in order, and would have been connected therefrom in the coded arrangement corresponding to the called party (key K12–) to the proper oscillator inputs.

Returning to the example at hand, terminal group TG–15 is activated and terminals 15T–1 to 15T–12 will have successively applied thereto a pulsed ground potential. Each terminal pair corresponds to a digit of the called party address code and is connected to the pair of inputs at the oscillator which correspond to the frequencies of the digit to be transmitted. Since each terminal is pulsed in sequence as described above, each multifrequency pulse is transmitted in a sequential manner.

For example, if the address code for the called line is area code 213, exchange code 628, and number 1234, the tone conductors F1 to F7 would be so connected so that the combination of frequencies desired from terminal punchings *f*1 through *f*7 of Oscillator 27 corresponding to a digit "2" would appear in the first digit position 15T–1 on terminal group TG–15. The combination of tones corresponding to the digit "1" would appear in the second digit position 15T–2 on terminal group TG–15, and so forth through to the tenth and last digit required.

As will be further described subsequently, a ground appearing on terminal punching *f*1 of Oscillator 27 causes a frequency *f*1 to be transmitted over conductor 39 to a central office capable of receiving the same. Similarly, grounds appearing on terminal punchings *f*2 through *f*7 act likewise. In the example used here in connection with a Touch-Tone arrangement, the following tabular arrangements show the frequencies used and the correspondence between the frequencies and the conventional digits on a telephone set.

Frequency in cycles per second:

| | |
|---|---|
| 697—*f*1 | 1209—*f*5 |
| 770—*f*2 | 1336—*f*6 |
| 852—*f*3 | 1477—*f*7 |
| 941—*f*4 | |

| Digit: | Multifrequency combination |
|---|---|
| 1 | *f*1, *f*5 |
| 2 | *f*1, *f*6 |
| 3 | *f*1, *f*7 |
| 4 | *f*2, *f*5 |
| 5 | *f*2, *f*6 |
| 6 | *f*2, *f*7 |
| 7 | *f*3, *f*5 |
| 8 | *f*3, *f*6 |
| 9 | *f*3, *f*7 |
| 0 | *f*4, *f*6 |

B. *Operation—typical call*

Having thus described the operation of the major components, and continuing with the illustrative called telephone number 213–628–1234 which corresponds to the actuation of key K15–1 of station 1, the overall circuit operation may now be described with reference to the circuitry shown in FIGS. 2 through 4.

After coming off-hook and actuating key K15–1, relay 2–D15 is energized. The operation of relay 2D–15 completes an energization path for relay 2–S1 as described above which, upon operation, causes all of the station busy lamps L1 to L*n* to light in addition to providing a holding path for relay 2D–15. Relay 2D–15 operated also initiates the operation of the timing circuit which produces ground potentials on its three output conductors 41, 42, and 43 in a manner so as to cause the stepping relays of the matrix control circuit to first consecutively step in the direction from relay 2–S1 toward relay 2–S6 in response to the potentials appearing on conductors 41 and 42. After the operation of relay 2–S6, relay 2–UH operates and the chain begins to release sequentially from relay 2–S6 toward 2–S1 until, relay 2–S1 by releasing, causes the release of relays 2–UH, and 2–D15, the deactivation of the timing circuit, the restoration of the busy lamps to normal and the restoration of all circuit parts to the initial state to await the next call. A circuit path in the matrix switch from conductor 43 to each of the conductors 1 through 12 in turn is sequentially completed in response to each step of the relays of the matrix control circuit, also as described above. After each circuit is completed, a ground pulse is applied to conductor 43 by the timing circuit so that the ground pulse travels sequentially from conductor 1 to conductor 12. These sequential grounds are split into pairs of sequential grounds (by the isolating diodes of the matrix switch) which appear at all fifteen terminal groups corresponding to the fifteen keys. Since key K15–1 has been actuated, only the relay switches of relay 2–D15 of terminal group TG–15 are closed. Moreover, since the illustrative telephone number contains but ten digits, only terminals 15T–1 through 15T–10 are used and cross connected by means of conductors F1 through F7 to the proper terminals from amongst *f*1 to *f*7 of the oscillator.

Thus, to establish the proper coded cross connections for the telephone number 213–628–1234 the pair of oscillator terminals *f*1 and *f*6, which correspond in frequency to 697 c.p.s. and 1336 c.p.s., respectively, are connected by conductors F1 and F6, respectively, to terminal 15T–1 of terminal group TG–15. The remaining digits of the telephone number are similarly connected according to the same scheme and the correspondence between telephone number digit, corresponding multifrequency combination, and terminals of the selector connected to from the corresponding oscillator terminals is shown in the table below:

| Telephone Number Digit | Equivalent Multi-frequencies | Connection from Corresponding Oscillator Terminal to Selector Terminal |
|---|---|---|
| 2 | *f*1 and *f*6 | 15T–1 |
| 1 | *f*1 and *f*5 | 15T–2 |
| 3 | *f*1 and *f*7 | 15T–3 |
| 6 | *f*2 and *f*7 | 15T–4 |
| 2 | *f*1 and *f*6 | 15T–5 |
| 8 | *f*3 and *f*6 | 15T–6 |
| 1 | *f*1 and *f*5 | 15T–7 |
| 2 | *f*1 and *f*6 | 15T–8 |
| 3 | *f*1 and *f*7 | 15T–9 |
| 4 | *f*2 and *f*5 | 15T–10 |

The sequentially appearing grounds on conductors 1 through 12 sequentially pulse terminals 15T–1 through 15T–12 of terminal groups TG–15. The grounds on each of the terminal pairs 15T–1 through 15T–10 sequentially pulse excite the terminals of the oscillator according to the tabular scheme set out above and the oscillator sequentially pulses out pairs of multifrequency digits corresponding in frequencies and order of transmission to the address code of the illustrative telephone number called over conductor 39 to the central office which thereafter conventionally completes the call.

As indicated previously, it should be obvious that twelve digits could have been transmitted with the arrangement shown had the proper combination of conductors from terminals *f*1 through *f*7 of oscillator 27 been connected to the terminals 15T–11 and 15T–12. For this illustration it is assumed that a ten-digit address code has been transmitted. Also it should be obvious that more than twelve digits can be transmitted by rearranging the matrix control circuit in an obvious fashion by adding more 2S-relays. This embodiment is illustrative and is not to be deemed limiting.

The invention is completely compatible with existing equipment and in no way limits the normal dialing operation of a standard telephone set provided. The method of automatic dialing described is extremely fast, accurate, reliable, and versatile for a subscriber need only come off-hook and depress a button corresponding to the desired party. A minimum amount of circuitry is required as seen from the drawings provided, for all the equipment shown is common to the totality of automatic dialed stations with the exception that one key and one relay associated with each key is provided on a per customer basis. If it is desired to have additional extension telephones capable of dialing the same called stations, a key field at each extension must be provided. Finally, it is to be noted that my invention can be used in conjunction with any central office which has equipment capable of accepting multifrequency pulses and it is not necessary that a Touch-Tone set be used so long as a suitable oscillator is incorporated with the actual telephone used.

It is to be understood that the above-described arrangements are illustrative of the applications of the principles of the invention. Numerous other arrangements may be devised by those skilled in the art without departing from the spirit and scope of the invention.

What is claimed is:

1. An automatic dialer for use in a telephone system to automatically call any one of a group of distant stations comprising a plurality of keys, each of which corresponds to a particular distant station, a group of stepping relays common to all of said keys for stepping first in a forward direction and subsequently in a reverse direction, means responsive to the actuation of a particular one of said keys to initiate and control said stepping relays, a group of conductors, means responsive to said relays for applying a coded sequence of voltage pulses to said conductors, and oscillator means responsive to said coded sequence of voltage pulses for generating telephone address signals.

2. An automatic dialer for use in a telephone system to automatically call any one of a group of distant stations comprising a plurality of keys each of which corresponds to a distant station address code, a chain of stepping relays common to all of said keys, a control means responsive to the actuation of one of said keys for synchronously controlling the operation of said relays to first step in a forward direction and subsequently step in the reverse direction, a second means including a group of conductors equal in number to the number of digits in said distant station's address code responsive to said relays and said control means to provide a voltage pulse on each conductor in turn, means responsive to said voltage pulses to encode said distant station's address code into a sequence of coded voltage pulses corresponding to said actuated key, and oscillator means for translating said coded voltage pulses into multifrequency tones.

3. An automatic dialer for use in a telephone system to automatically call any one of a group of distant stations in accordance with claim 2 further comprising a group of calling extension stations each comprising a plurality of keys wherein said plurality of keys are multiplied to each of said extension stations.

4. An automatic dialer for use in a telephone system to automatically call any one of a group of distant stations in accordance with claim 3 wherein each of said groups of extension stations provided with said plurality of keys includes in addition a busy lamp for indicating the use of one of said keys at another of said extension stations.

5. An automatic multifrequency call transmitter for connecting a calling station to any one of an arbitrary number of called stations comprising a calling station, a plurality of called stations each having a different address code, automatic connecting control circuit means including a central office for connecting said calling stations to one of said called stations, a plurality of keys each of which corresponds to a particular called station, common timing circuit means responsive to the actuation of any one of said keys to produce a timed sequence of voltage pulses, matrix control circuit means comprising a group of stepping relays common to all of said keys and responsive to the actuation of said keys and said voltage pulses for stepping in a first direction and subsequently stepping in a second direction, a group of conductor pairs equal in number to the number of digits in said address code of said called station corresponding to said actuated key, switching means responsive to said matrix control circuit means for successively applying one of said voltage pulses to each of said conductor pairs, oscillator means comprising a plurality of inputs and a single output, said oscillator means producing at said output for transmission to said central office a distinct frequency potential corresponding to the particular one of said inputs excited, and means for sequentially exciting pairs of said oscillator inputs from said conductor pairs including said switching means for transmitting multifrequency address pulses to said central office.

6. An automatic multifrequency call transmitter for connecting a calling station to any one of an arbitrary number of called stations comprising a first station, a plurality of second stations each having a different address code, central office means for automatically connecting said first station to one of said second stations, a plurality of keys each of which corresponds to a particular second station, common timing circuit means including a source of potential and output conductor means responsive to the actuation of any one of said keys to sequentially connect said source of potential to said conductor means, said conductor means further comprising first, second and third conductors, common matrix control circuit means comprising a plurality of relays arranged in a chain and an auxiliary relay included in said chain, said relay chain having a first and a second input terminal means, means for connecting said first and second conductors of said timing circuit output conductor means to said first and second terminal means respectively to initially sequentially energize said relay chain in a first direction and to energize said auxiliary relay, means for subsequently sequentially de-energizing said relay chain in a second direction after the energization of said auxiliary relay, means for disconnecting said source of potential from said timing circuit output conductor means and de-energizing said auxiliary relay responsive to the de-energization of said relay chain, a group of conductor pairs equal to the number of digits in said address code of said keyed second station, switching means including the contacts of said relays in said relay chain effective to successively apply said source of potential connected to said third conductor of said timing circuit output conductor means to each of said conductor pairs, oscillator means comprising a plurality of inputs and an output, said oscillator means producing at said output a distinct frequency potential corresponding to the particular one of said inputs excited, means including said switching means for sequentially exciting selected pairs of said oscillator inputs from said conductor pairs to produce coded pairs of said frequency potentials and means for transmitting said coded frequency pairs to said central office.

7. An automatic multifrequency call transmitter in accordance with claim 6 wherein said matrix control circuit means further comprises means responsive to the energization of each of said relays in said relay chain to hold said relay energized and to prepare an energization path for the next higher relay in said chain, means responsive to the energization of said auxiliary relay to de-energize the last energized relay in said chain and to connect said second and first conductors of said timing circuit output conductor means to said first and second terminal means respectively, and shunting means including the contacts of said energized auxiliary relay responsive to said timing circuit means to sequentially effect the release of said relays in said chain.

8. An automatic multifrequency call transmitter in accordance with claim 6 wherein said matrix control circuit means comprises means for automatically and sequentially applying said source of potential applied to said third conductor of said timing circuit output conductor means to a number of said conductor pairs equal to two times the number of said relays in said chain exclusive of said auxiliary relay.

9. A sequential pulse transmitter comprising relay means including a plurality of relays arranged in a chain, an auxiliary relay included in said chain, said relay chain having a first and a second input terminal, a source of potential, means for cyclically applying said source of potential to said first and second terminals to sequentially energize said relay chain in a first direction, means for sequentially de-energizing said relay chain in a second direction in response to the energization of said auxiliary relay, means for terminating said cyclical application of said potential source to said relay chain and de-energizing said auxiliary relay in response to the de-energization of said relays in said chain, a group of conductors equal to twice the number of said plurality of relays in said relay chain, and means including the contacts of said relays in said relay chain for successively and sequentially applying pulses from said source of potential to said group of conductors.

10. A sequential pulse transmitter comprising relay means including a plurality of relays arranged in a chain, an auxiliary relay included in said chain, first, second and third input terminal means to said chain, a source of potential, a first means for alternately applying said source of potential initially to said first terminal means and subsequently to said second terminal means and for applying said source of potential to said third terminal means in intervals intermediate said alternate application to said first and second terminal means, and additional means responsive to said alternate application of potential to said first and second terminal means to first sequentially energize said relays in a forward direction and subsequently to sequentially de-energize said relays in a reverse direction in response to the energization of said auxiliary relay, second means responsive to the de-energization of said relays in said chain to disable both said first means and said auxiliary relay, a group of conductors equal in number to twice the number of said plurality of relays in said chain, and a third means responsive to both the application of said source of potential applied to said third input terminal means and to the operation and release of said relays to sequentially apply to each of said conductors in turn a pulse from said source of potential.

11. A sequential pulse transmitter in accordance with claim 10 wherein said relay chain together with said auxiliary relay comprises a first group of odd numbered relays and a second group of even numbered relays, said first input terminal means comprises conducting path means extending to each of said first group of relays; said second input terminal means comprises conducting path means extending to each of said second group of relays; means including said first and second terminal means responsive to each application of said source of potential to alternately energize one relay from each of said groups in succession; means responsive to the energization of any one of said relays to hold said energized relay operated and to prepare an energization path for the next higher numbered relay in said chain; means responsive to the energization of said auxiliary relay to electrically interchange said first and second input terminal means; and means including said reversed input terminal means, said energized auxiliary relay and said next higher relay responsive to the appearance of subsequent pulses from said potential source to release said relays in said chain in reverse order.

No references cited.

KATHLEEN H. CLAFFY, *Primary Examiner.*

H. ZELLER, *Assistant Examiner.*